United States Patent
Haghighat et al.

(10) Patent No.: US 7,143,404 B2
(45) Date of Patent: Nov. 28, 2006

(54) PROFILE-GUIDED DATA LAYOUT

(75) Inventors: Mohammad R. Haghighat, San Jose, CA (US); David C. Sehr, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 10/403,601

(22) Filed: Mar. 31, 2003

(65) Prior Publication Data

US 2004/0193815 A1   Sep. 30, 2004

(51) Int. Cl.
G06F 9/45   (2006.01)
(52) U.S. Cl. ...................................... 717/159
(58) Field of Classification Search ................ 717/159
See application file for complete search history.

(56) References Cited

U.S. PATENT DOCUMENTS

| | | | |
|---|---|---|---|
| 5,937,191 A * | 8/1999 | Graham ...................... | 717/130 |
| 5,963,972 A * | 10/1999 | Calder et al. ............... | 711/129 |
| 6,381,739 B1 * | 4/2002 | Breternitz et al. ........... | 714/37 |
| 6,381,740 B1 * | 4/2002 | Miller et al. ................ | 717/151 |
| 6,728,701 B1 * | 4/2004 | Stoica .......................... | 707/3 |
| 6,862,729 B1 * | 3/2005 | Kuch et al. .................. | 717/158 |
| 2003/0061004 A1 * | 3/2003 | Discenzo .................... | 702/182 |
| 2004/0172612 A1 * | 9/2004 | Kasravi et al. ............. | 717/101 |

OTHER PUBLICATIONS

Chilimbi, et al., Cache-Conscious Structure Layout, Proceedings of the ACM SIGPLAN 99 Conference, May 1999, 12 pages.
Rabbah, et al., Data Remapping for Design Space Optimization of Embedded Memory Systems, Georgia Institute of Technology, ACM Transactions, Fall 2002, 33 pages.
Chilimbi, et al., Making Pointer-Based Data Structures Cache Conscious, 15 Pages.
Pettis, et al., Profile Guided Code Positioning, ACM SIGPLAN Conference, Jun. 20-22, 1990, pp. 16-27, New York.
Muchnick, Steven S., Advanced Compiler Design Implementation, 1997, Chapter 20, pp. 669-704, Morgan Kaufmann Publishers, San Francisco, Calif.

* cited by examiner

*Primary Examiner*—John Chavis
(74) *Attorney, Agent, or Firm*—Shireen I. Bacon

(57) ABSTRACT

A method for optimizing (re-structuring) data layout for 1) local or global variables and/or 2) fields of a structure or object and/or 3) function pointers in a virtual function table in a compiled program is based on profile feedback. A user, such as a software programmer, identifies one or more classes of data elements in an application that the user wishes to optimize. A method, which may be implemented in a software program such as a compiler, analyzes the profile for the designated data elements to determine, based on the application's temporal behavior, how to order the designated data elements in order to optimize data cache performance.

51 Claims, 7 Drawing Sheets

PROFILE-GUIDED DATA LAYOUT

BACKGROUND

1. Technical Field

The present invention relates generally to information processing systems and, more specifically, to layout of data for an application program in order to optimize data cache performance.

2. Background Art

Most programming languages support the use of local procedure variables as well as global program variables. Moreover, several programming languages, such as the Java™ programming language, are object-oriented programming languages that support the notion of objects. These objects may contain one or more fields. Similarly, many programming languages, such as the C/C++™ languages, support the notion of structures that contain one or more fields. The fields of an object or structure may themselves include other objects or structures, respectively.

As a software application processes data, it often pulls data from a data cache. If the desired data is not present in the cache, then a time-consuming memory fetch is performed. For instance, if a local or global variable is not in the data cache when needed by an application, then the variable is fetched from memory. Of course, data cache performance is enhanced when a single data cache-line fetch pulls in multiple variables needed by the program, thereby decreasing the number of necessary cache fetches.

Similarly, the performance of a system running an application that processes large amounts of data in objects or structures critically depends on the performance of its data cache. A large class of applications, such as data-base servers and compilers, process large volumes of data that are typically organized into many different types of records, including objects or data structures. Known efforts to improve the performance of, or "optimize", the data cache nearly always focus on loop transformations that improve the performance of numerical or scientific code. Numerical code most often manipulates large arrays of data and thus has opportunities to benefit from temporal and spatial locality. Loop transformations use dependence analysis to increase the data locality while maintaining the application's program semantics.

However, these data cache optimization efforts are not usually effective in the cases of integer code, for instance, or other code that includes a large number of branches that are hard to predict. Also, there are currently very few known techniques for improving the data locality of integer applications that heavily use pointers and structures. The few known techniques strive to align structure fields based on the fields' types, but do not choose a layout structure based on the application's temporal behavior.

Embodiments of the method and apparatus disclosed herein address these and other concerns related to enhancing data layout for in an application in order to improve data cache performance.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for profile-guided data layout.

DETAILED DISCUSSION

Figure 1:
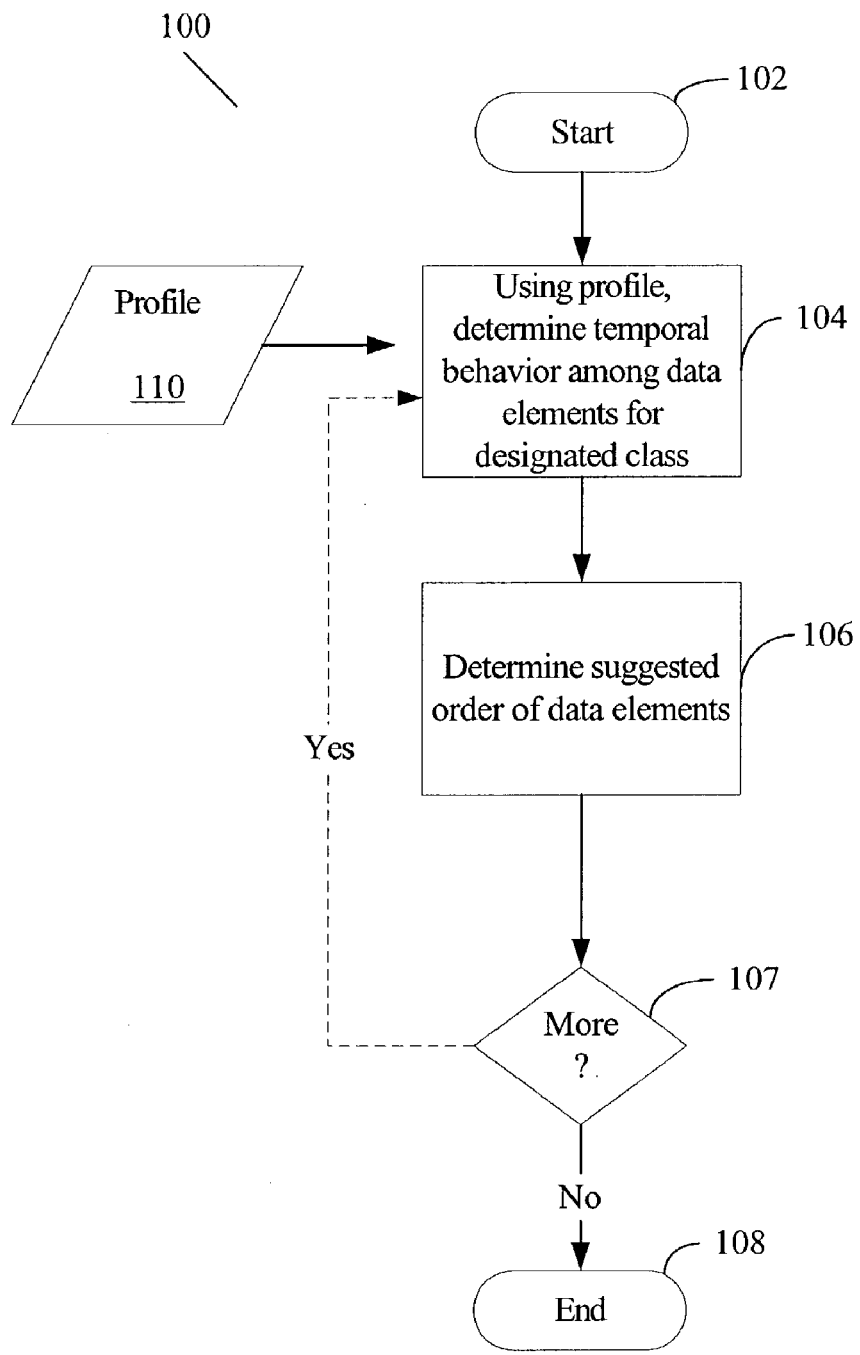
FIG. 1 is a flowchart illustrating a method of performing profile-guided data layout in accordance with at least one embodiment of the present invention.

FIG. 1 is a flowchart illustrating control flow and data flow for an automated method 100 of determining a suggested order of data elements. The method may be applied to determine a suggested ordering for any of several classes of data elements, including local variables, global variables, or the fields of a structure or object. The method 100 is "profile-guided" in the sense that it utilizes profile data 110 to determine the temporal behavior of an application program with respect to one or more user-designated data structure(s), object(s) or variable(s). That is, the profile reflects the access pattern for the application's accesses to the designated data elements. This access pattern captures "temporal locality" in that, for the fields of the designated structure/object, or for the designated variables, it captures the way fields/variables are accessed in relation to each other according to time. A benefit of the method 100 is that access pattern information from the profile 110 may be used in the process of ordering the fields of a structure or object, or ordering local and/or global variables, such that those fields/variables that are accessed successively in time are likely to be in the same data cache line.

As used herein, the term "automated" refers to an automated process wherein the method 100 is performed automatically without human intervention. One skilled in the art will recognize that, in alternative embodiments, all or part of the disclosed methods may be performed manually. However, at least one is performed automatically by a compiler.

FIG. 1 illustrates that the method 100 receives a profile 110 as in input. The concept of temporal locality says that once a field of a structure is accessed, it is likely that the same or another field of the same structure will be accessed shortly thereafter. Similarly, temporal locality provides that variables will be accessed in close proximity (in terms of time) to each other.

Using the profile 110, the method 100 determines 104 the temporal behavior among designated data elements. As used herein, the term "data element" is used generically to encompass all of the following types of data: local variables, global variables, fields of a structure, fields of an object, and function pointers of a virtual function table for object-oriented applications.

Using this determination of which data elements are likely to be accessed near to each other in time, the method 100 determines 106 a suggested data ordering for the designated data elements, with an aim to order the data elements for memory storage such that a single data cache line is likely to contain data elements that are likely to be accessed close (in time) to each other.

FIG. 1 illustrates that the method 100 may be performed for more than one designated class of data elements. That is, the method 100 may be performed for the fields of multiple objects or structures. The method 100 may be performed for both local and global variables. Of course, any combination of single or multiple object(s) and or structure(s) along with local and/or global variables may be addressed by the method 100. At block 107, it is determined whether additional classes of data elements are to be processed. If not, then processing ends at block 108.

If processing for additional designated data elements is indicated at block 107, then processing continues at block 104 to process the next structure or object, or to process the next set of variables. For at least one embodiment, the determination at block 107, in relation to structures or objects, is aided by a syntax construct utilized by the user. That is, for at least one embodiment, the user, such as a software programmer, designates the objects or structures to be re-ordered according to the method 100 of FIG. 1 by placing an "order" instruction in the application source code (such as, for example, source code 204 in FIG. 2). In this manner, the compiler becomes aware of the name of the fields it should consider for re-ordering.

For example, consider the following illustrative sample declarations, where the first declaration declares a structure type and variable for a single employee and the second declaration declares a structure type and variable for a married employee:

```
__declspec (order) struct person {
    int            id;
    char[NAMESIZE] Name;
    int            SSN;
} s_employee;
__declspec (order*)   struct couple {
    int            id;
    char[NAMESIZE] Name;
    int            SSN;
    struct person  spouse;
} m_employee;
```

By adding the syntax "__declspec (order)" to the first declaration, the programmer indicates to the compiler that the compiler should choose any ordering of the fields of s_employee that the compiler determines will aid in data cache performance, given the anticipated temporal behavior of the application program in relation to accesses of the fields of s_employee. Similarly, by adding the syntax "(order*)" to the second declaration, the compiler is notified that it should not only determine an appropriate order for the fields of m_employee, but it should also determine ordering for the fields of m_employee member fields that are structures themselves (such as spouse). Accordingly, a user, such as the application programmer, may indicate that more than one structure type should be re-ordered. In such case, the check 107 for further processing will evaluate to "true" and processing of the method 100 will continue until all designated fields have been processed 104, 106.

The preceding paragraphs are based on an assumption that the compiler is free to choose any order for the fields of the designated structure or object in the programming language at issue (i.e., the programming language that the source code 204 (FIG. 2) is written in). For example, the Java™ programming language, the order of the fields in objects is unspecified. The compiler/Java virtual machine is therefore free to select any order for the fields of the designated object(s). In such case, the purpose of the "__declspec (order)" and the "__declspec (order*)" syntax is to indicate to the compiler those objects for the user wishes field re-ordering. Alternatively, the user may dispense with the "__declspec (order)" and "__declspec (order*)" syntax altogether, with the result that the compiler is free to re-order the fields of all objects.

In contrast, the C and C++ programming languages support unrestricted us of pointers as well as pointer arithmetic. For such languages, it is not theoretically feasible to identify all potential pointers to a particular field in all programs. Standards-compatible programs can be developed whose correct execution depends on the structure fields being ordered the same way as specified by the original program. For structures in C and C++, the "__declspec (order)" and "__declspec (order*)" syntax not only indicates the user's desire that the fields of the structure be re-ordered, but also indicates that the compiler is at liberty to choose an efficient order.

Of course, on skilled in the art will recognize that the "__declspec (order)" and "__declspec (order*)" syntax set forth above is just one example of a language extension that may used to indicate such information to the compiler. Any language extension may be used. Alternatively, the same functionality may be performed by means of a pragma.

One will also note that the "__declspec (order)" and "__declspec (order*)" syntax is not necessarily used for re-ordering of certain constructs, such as local and global variables. For such constructs, the compiler usually has sufficient freedom to re-order. For example, in certain programming languages, such as Java™, the compiler is completely free to re-order the local variables. Similarly, the semantics of the C/C++™ language allow re-ordering of global and local variables. Accordingly, for at least one embodiment of the method 100, the user asks the compiler and the linker, through a switch, to select an optimized order for global variables. Similarly, the compiler automatically determines an optimized order for local variables unless requested by the user, through a switch, not to do so. For structure and object fields, re-ordering selection is handled through the "__declspec (order)" and "__declspec (order*)" syntax as described above.

Figure 2:
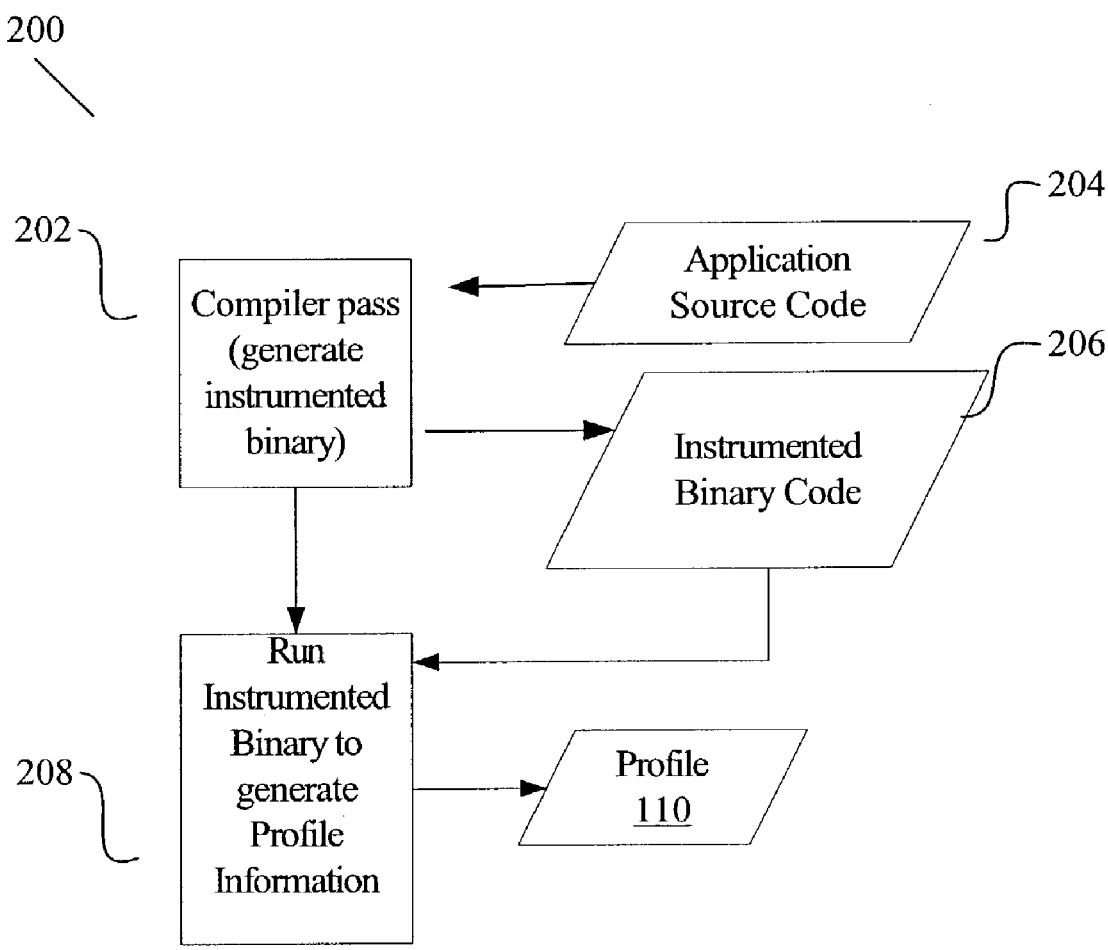
FIG. 2 is a flow diagram illustrating at least one embodiment of a compilation process that results in generation of profile information.
Figure 3:
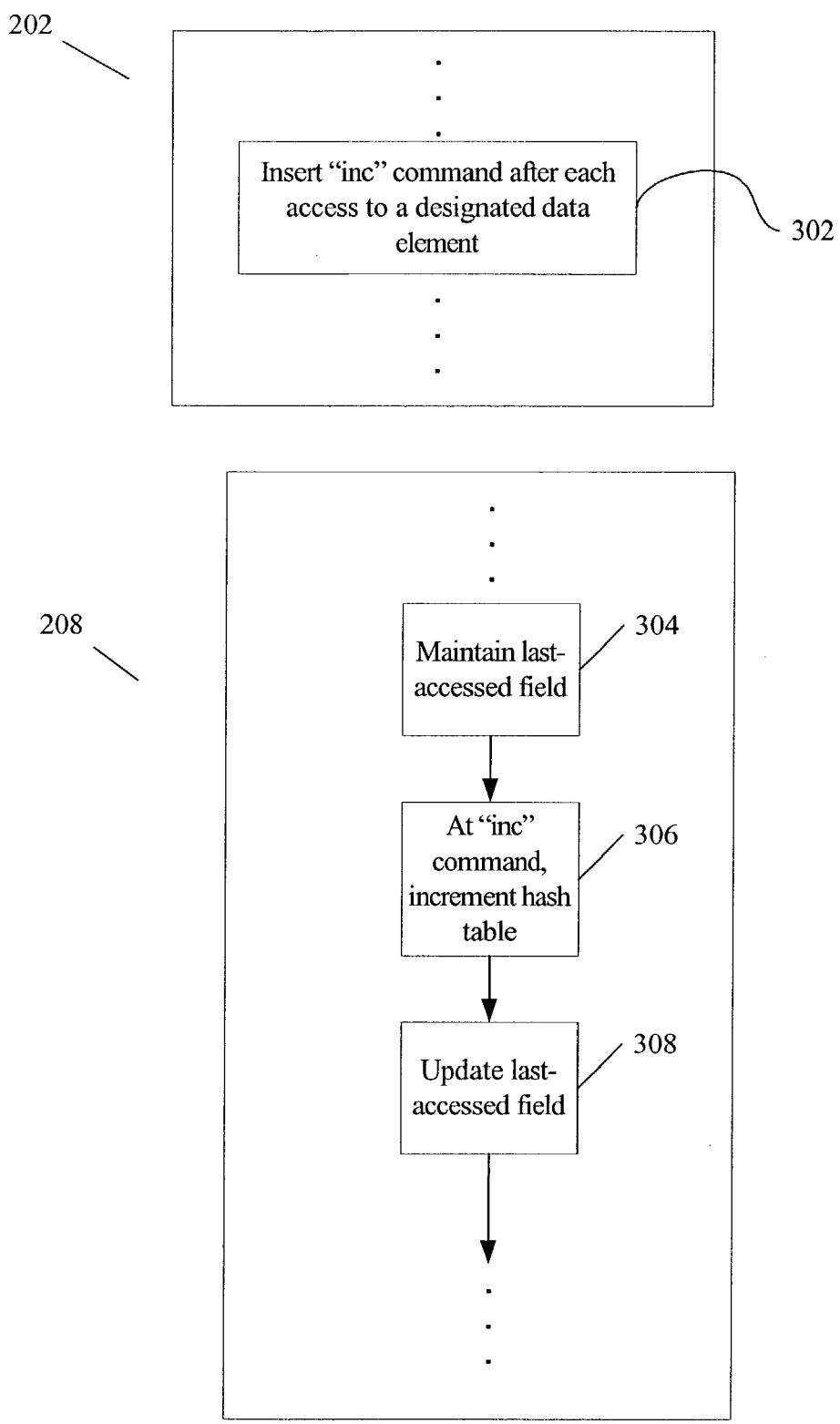
FIG. 3 is a block diagram illustrating at least one embodiment of additional processing to capture information regarding temporal behavior among data elements of a program.

Reference to FIGS. 2 and 3 provides background information concerning at least one embodiment of a method 200 for generating of the profile 110 that is utilized in the method 100 of FIG. 1. Generally speaking, a profile 110 is generated by running an instrumented version 206 of the application source code 204. An instrumented binary code 206 file contains binary code for the application program's source code 204 instructions. The instrumented binary code 206 file also includes extra binary instructions that cause, during a run of the instrumented code 206, statistics to be collected and recorded in a profile 110. The instrumented code 206 may be generated by means of a binary rewriting tool (not shown). A binary rewriting tool may create an instrumented version 206 of the application 204 by adding machine instructions at the appropriate locations in the file 206 to keep track of information regarding execution of the application 204.

Alternatively, FIG. 2 illustrates that a compiler, rather than a rewriting tool, may generate the instrumented binary code 206. In such embodiments, the binary source code 204 for the application program typically is run through a first pass 202 of a compiler. During the first pass 202, the compiler (e.g., 709 in FIG. 7) receives as an input the source code 204 for which compilation is desired. During the first pass 202, the compiler "instruments" (adds instructions to) binary instructions for the source code 204 in order to generate an instrumented binary code 206 file that corresponds to the source code 204. In such case, the compiler inserts probe instructions at the appropriate locations in the file 206 to keep track of information regarding execution of the application 204.

FIG. 3 illustrates that, for at least one embodiment, during the first pass 202, the compiler also inserts 302 an "increment" command after each access to a designated data element (such as a variable or a field in the designated structure or a variable). The "increment" command is designed to increment a frequency count each time a designated data element is accessed. As will be discussed further below in connection with block 208, the frequency count may correspond to a directed edge between two nodes (the accessed node and the last-accessed node) in a graph of the designated class of data elements (i.e., an object, structure, set of local variables or set of global variables), and may also correspond to a hash table entry rather than an individual count variable for the specific node-to-node edge.

FIG. 3 also illustrates further processing that occurs during at least one embodiment of generation 208 (FIG. 2) of the profile 110 (FIG. 2). For a given structure in a single-threaded application, the compiler maintains 304 a global variable, referred to herein as last_field, that records the most recently-accessed data element. For example, last-field may maintain the most recently-accessed field of a designated structure or may maintain the most recently-accessed local or global variable. When any other of the designated class' data elements, referred to herein as current_field, is accessed, an increment operation occurs. That is, upon an additional reference to the current_field data element, (which may be a repeat access the same data element indicated in last-field), the "increment" command associated with current_field (see block 302) causes the appropriate frequency count to be incremented 306 by one. The frequency count that is incremented 306 corresponds to an edge between last_field and current_field. In addition, the last_field variable is updated 308 to reflect that current_field is now the most recently-accessed data element for the designated class.

Table 1, below, reflects a sample instruction stream and the resultant action taken according to the processing of block 208 as illustrated in FIG. 3.

TABLE 1

| Time | Instruction Stream | Action | Comment |
|---|---|---|---|
| ↓ | V3 | last_field = V3 | 304 - update last accessed data element |
| ↓ | V5 | Inc (V3 → V5); | 306 - Increment count for edge from V3 to V5; |
|  |  | last_field = V5 | 308 - update last accessed data element |
| ↓ | X1 | none | No action-data element not part of designated structure or object |
| ↓ | X2 | none | No action-data element not part of designated structure or object |
| ↓ | X3 | none | No action-data element not part of designated structure or object |
| ↓ | V2 | Inc (V5 → V2); | 306 - Increment count for edge from V5 to V2; |

TABLE 1-continued

| Time | Instruction Stream | Action | Comment |
|---|---|---|---|
|  |  | last_field = V2 | 308 - update last accessed data element |
| ↓ | V1 | Inc (V2 → V1); | 306 - Increment count for edge from V2 to V1; |
|  |  | last_field = V1 | 308 - update last accessed data element |

In Table 1, variables whose names begin with "V" represent designated data elements, such as designated local or global variables or the fields of a designated structure or object. Those variables whose names begin with "X" are unrelated to the re-ordering effort. The memory access stream represents attempts, over time as the instrumented code is running, to access data in the data cache. For each access to a "V" variable associated with a designated data element, the processing of block 208 as illustrated in FIG. 3 is performed. For the "X" fields, which are not associated with a designated data element, such profile processing is not performed.

One should note that the example provided in Table 1 applies to a single-threaded application. For multi-threaded applications, a thread-local last-field variable is maintained for each thread. More specifically, each thread of execution should have its own private copy of last-field to track the pattern of accesses on that thread. Threads may, however, share the global data structure representing the frequencies of accesses of each variable pair. On the other hand, when different threads have completely different variable access patterns, it may be desirable, in order to distinguish among threads, to maintain thread-specific frequencies structures.

Figure 4:
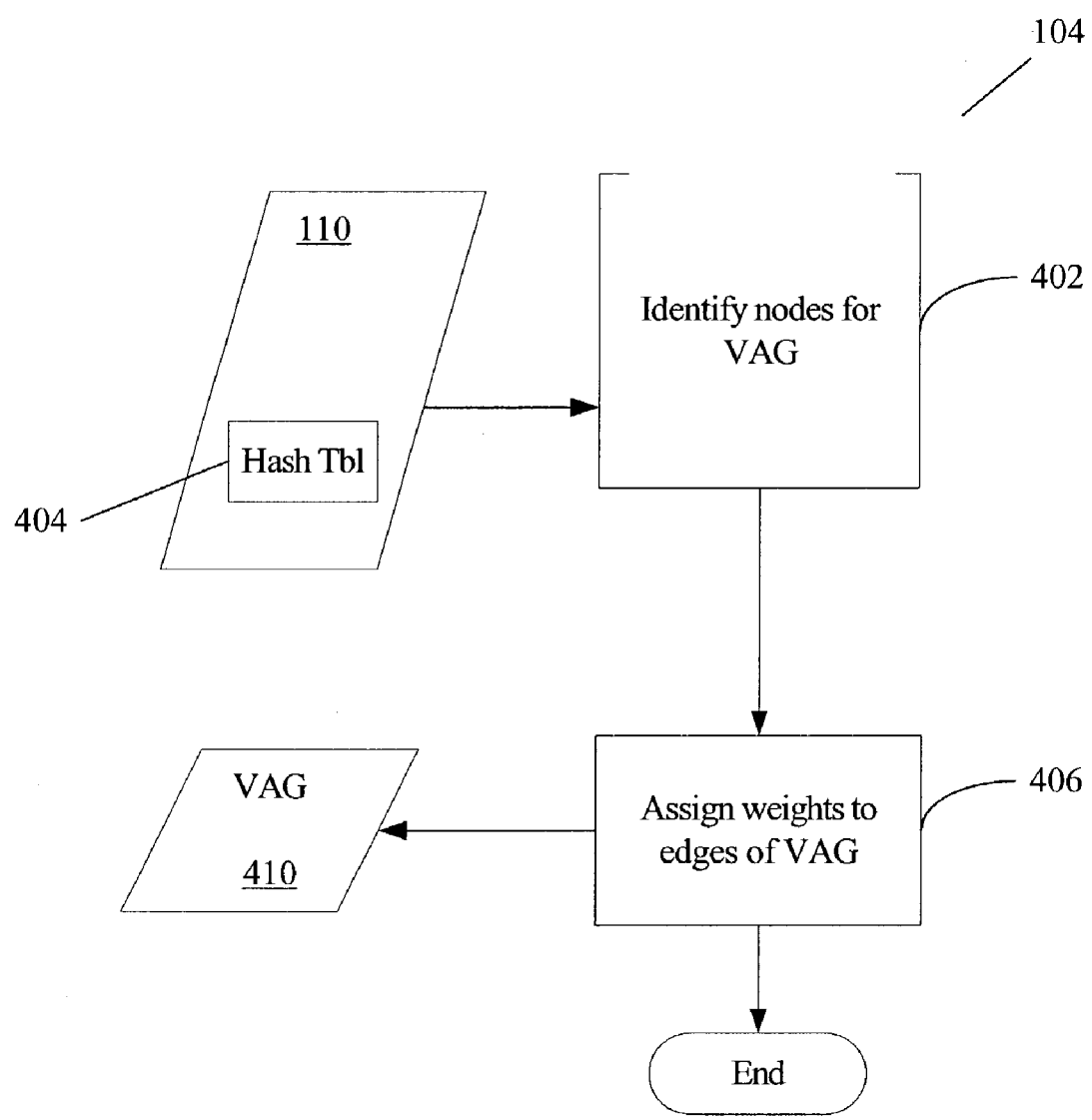
FIG. 4 is a flowchart illustrating at least one embodiment of a method for determining temporal behavior from profile information.

FIG. 4 illustrates additional processing 402, 406 associated with at least one embodiment of block 104 from FIG. 1. FIG. 4 illustrates that at least one embodiment of determining 104 temporal behavior of an application vis-à-vis accesses to designated data elements includes generation of a variables access graph ('VAG") 410.

Figure 5:
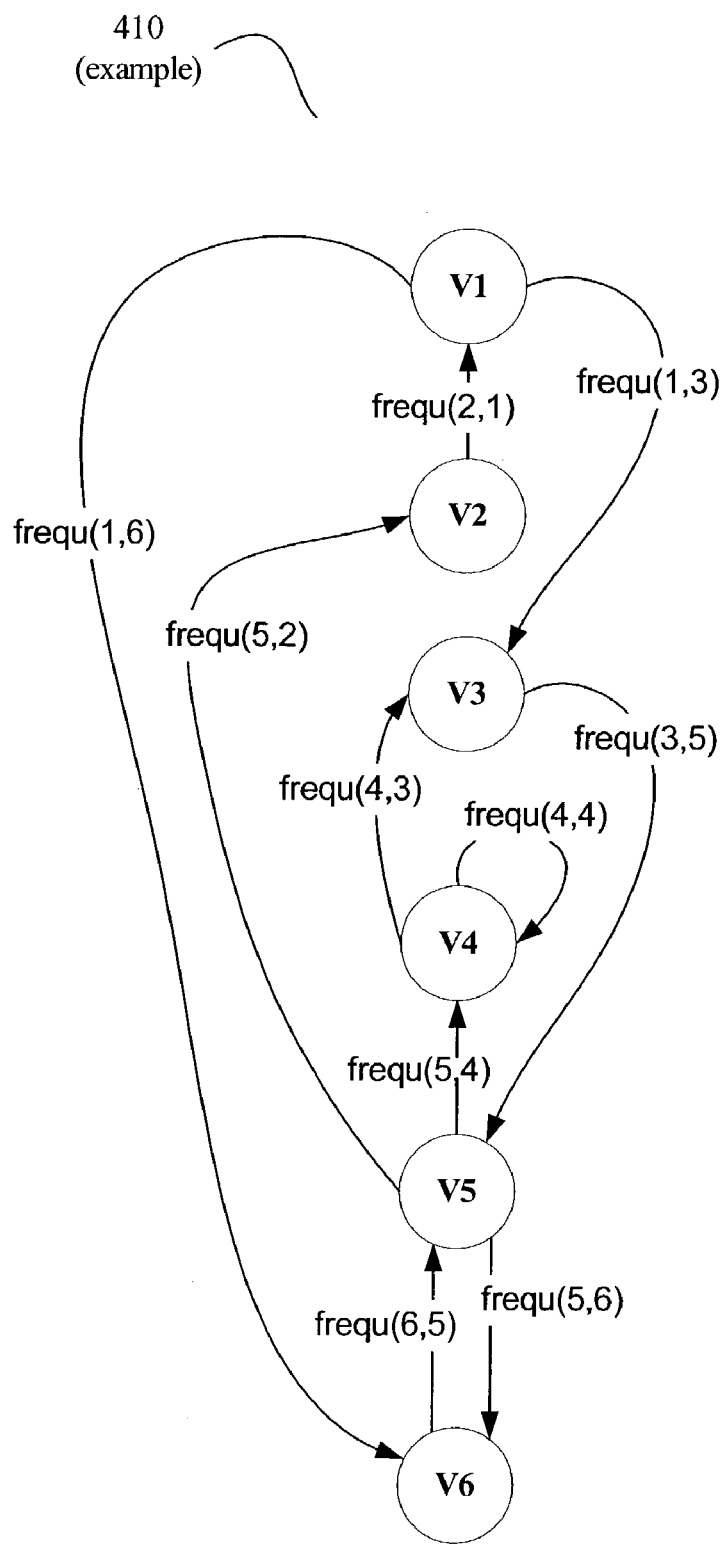
FIG. 5 is a block diagram of an illustrative Variables Access Graph.

FIG. 5 illustrates a sample VAG 410. FIG. 5 will be discussed herein with reference to FIG. 4. Using the profile information 110, the nodes of the VAG 410 are identified 402. The VAG 410 illustrated in FIG. 5 indicates that six designated data elements, V1 through V6, were accessed during the run 208 (FIG. 2) and identified at block 402.

The nodes of a VAG 410 have a one-to-one correspondence with the data elements of a designated class. If global or local variables are designated, then the nodes of the VAG 410 each correspond to a variable. If a structure or object is designated, then each node represents a field of the structure or object. One skilled in the art will realize that, for variables, the term "designated" should not be taken to require affirmative action on the part of the programmer. In some cases, "designation" happens by default through no action of the user (such may be the case, for example, for local variables).

The VAG 410 also includes directed edges between some of the nodes. A directed edge between a first and second node (for example, $V_i$ and $V_{ii}$) exists if and only if the second data element (i.e., Vii) is accessed after an access to the first data element (i.e., Vi) without any intervening access to another designated data element. Note that any two nodes may have two directed edges between them—one from the first node to the second node (in the case of at least one access of the second node following an access to the first node) and one from the second node to the first node (in the case of at least one access of the first node following an access to the second node). In addition, a node may also have an edge back to itself.

These edges are identified at block 406. An edge is identified between two nodes if the frequency count information in the profile 110 reflects that one of the nodes was accessed after the other node at least once, without any intervening accesses to a third designated data element. Such information is generated at block 302, and may be conceptualized as a matrix, such as the matrix illustrated in Table 2, below.

For illustrative purposes, the VAG 410 shown in FIG. 5 and the matrix shown in Table 2 corresponds to the following instruction stream: V1, X1, V6, V5, X2, X1, V2, V1, X3, V3, V5, X1, V6, V5, V6, V5, X3, V4, X2, V4, X1, V4, X2, V3.

TABLE 2

| Second node ↓ | First node | | | | | |
|---|---|---|---|---|---|---|
| | V1 | V2 | V3 | V4 | V5 | V6 |
| V1 | 0 | 1 | 0 | 0 | 0 | 0 |
| V2 | 0 | 0 | 0 | 0 | 1 | 0 |
| V3 | 1 | 0 | 0 | 1 | 0 | 0 |
| V4 | 0 | 0 | 0 | 2 | 1 | 0 |
| V5 | 0 | 0 | 1 | 0 | 0 | 3 |
| V6 | 1 | 0 | 0 | 0 | 2 | 0 |

Each cell in the matrix illustrated in Table 2 indicates how many times the second node is accessed after the first node, with no intervening accesses to other nodes representing designated data elements. While the information in Table 2 is, conceptually, a matrix, it need not be stored internally as a matrix representation. For instance, the matrix illustrated in Table 2 is very sparse. In such cases, it may be desirable to store frequency count information in a hash table 404. For multithreaded applications, the hash table 404 may maintain separate frequency counts for each thread.

FIG. 5 illustrates that the frequency count information generated at block 306 (FIG. 3) and illustrated in Table 2 may be recorded in the VAG 410. It should be noted that, in terms of internal representation, VAG 410 may be represented in any of the various known forms, including linked structures and matrices. For instance, a linked structure may be desirable for sparse VAGs while matrix representation, such as bit vectors or arrays, may be desirable for dense graphs or those that are small in size.

Returning to FIG. 4, one can see that, at block 406, each edge of the VAG 410 is associated with its corresponding frequency count. Accordingly, the frequency count freq(1,3) provides a weight value for the edge from V1 to V3. According to the example matrix illustrated in Table 2, freq(1,3) provides a weight value of "1" (decimal) to the edge from V1 to V3. Similarly, freq(1,6), freq(2,1), freq(3,5), freq(4,3), freq(5,2), and freq(5,4) each provide weight values of "1" (decimal) to their respective edges. In addition, freq(4,4) and freq(5,6) provide a weight value of "2" (decimal) to their respective edges and freq(6,5) provides a weight value of "3" (decimal) to its edge.

According to the example matrix in Table 2, all other edges carry a weight of "0" (decimal), indicating that such access pattern was never encountered during the run 208 (FIG. 2) of instrumented binary code. Accordingly, FIG. 5 illustrates that each edge of the VAG 410 is associated with a weight equal to the number of times that the corresponding access pattern was observed during the run 208 (FIG. 2) of instrumented code.

An advantage of representing the matrix information illustrated in Table 2 as a graph 410 relates to utilization of known code layout tools. That is, a large of body of literature and known tools and algorithms aim at optimizing the instruction cache rather than the data cache. This art focuses on code layout (rather than data layout). Such tools and algorithms usually expect a control flow graph (CFG) or Call Graph (CG) as input.

If a VAG is appropriately created so that it has characteristics common to a CFG/CG, then the VAG can be used as input to existing code layout tools in order to achieve data layout optimization. VAGs 410 can be treated as CFGs/CGs and provided as input to code layout tools when variables are represented in the same manner that basic blocks are represented in CFGs AND weighted edges between nodes of a VAG are represented in the same manner that control flow edges between basic blocks are represented in CFGs. The processing 104 illustrated in FIG. 4, wherein each data element of a designated class is represented as a node of the VAG 410 and edges between nodes are weighted, satisfies these criteria.

Figure 6:
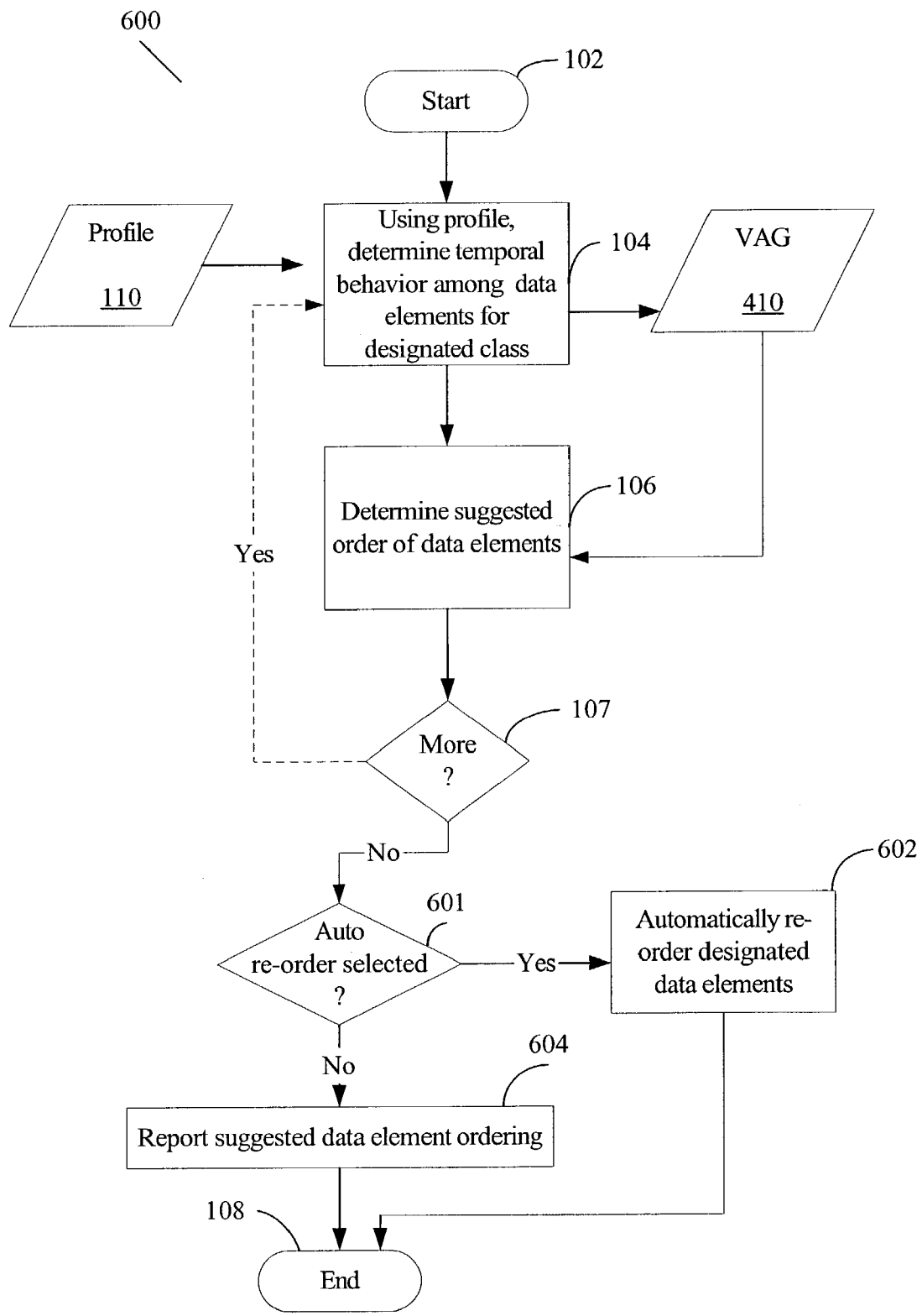
FIG. 6 is a flowchart of an embodiment for a method for profile-guided layout that includes recommending an order for, or automatically re-ordering, data elements.

FIG. 6 illustrates that, for at least one embodiment 600, the determination 106 of a suggested order for the designated data elements receives as an input the VAG 410 created at block 104. For at least one embodiment, this determination 106 is made via a code layout algorithm that is applied to the VAG 410.

FIG. 6 illustrates that the embodiment 600 illustrated in FIG. 6 includes additional processing after a suggested order for the designated data elements has been determined 106. If it is determined 107 that no remaining classes of data elements are to be processed, then processing proceeds to block 601.

At block 601 it is determined what type of output is desired by the user. This may be accomplished through either compiler options devised specifically for this purpose or by means of checking for language extensions such as the _declspec(order) and _declspec(order*) extensions described above. If it is desired that the compiler automatically re-order the fields of the designated object(s) or structure(s), or automatically re-order local or global variables, then processing continues at block 602. Otherwise, processing proceeds to block 604.

At block 602, the compiler automatically orders the designated data elements. This approach may be integrated into the optimization phase of any compiler that supports profile feedback. An advantage of this approach is that the user (such as an application programmer) need not himself modify the source code 204 (FIG. 2) to utilize the suggested ordering determined 106 by the method. Instead, the compiler automatically utilizes the ordering suggested at block 106.

If, however, the user has indicated that automatic re-ordering is not desired, processing proceeds to block 604. The user may, for example, indicate that automatic ordering is not desired by invoking a compiler option to prevent the compiler from performing default re-ordering. At block 604, the compiler communicates (such as, for example, by a text report file, data display, or other means of communication with the programmer) a suggested ordering for the designated data elements. This approach is particularly suitable for compilers that do not support automatic profile feedback.

Using the ordering information communicated at block 604, the programmer can then edit the source code 204 (FIG.

2) to impose the desired ordering and add other changes if necessary. For example, the information communicated at block 604 may indicate that a particular field should be the first or the last member of a structure. The developer can utilize this information to manually edit the source code 204 (FIG. 2) to reflect the suggested ordering.

In the preceding description, various aspects and embodiments of a method for determining data layout for one or more designated objects or structures in order to increase data cache performance have been described. For purposes of explanation, specific numbers, examples, systems and configurations were set forth in the preceding description in order to provide a more thorough understanding. However, it is apparent to one skilled in the art that the described methods may be practiced without the specific details. In other instances, well-known features were omitted or simplified in order not to obscure the method.

Embodiments of the disclosed methods 100, 600 may be implemented in hardware, software, firmware, or a combination of such implementation approaches. Software embodiments of the methods 100, 600 may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the dynamic method described herein is not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. As used herein, the term "storage device" my include dynamic random access memory (DRAM), static random access memory (SRAM), synchronous DRAM (SDRAM), or extended data out DRAM (EDO DRAM).

The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 7:
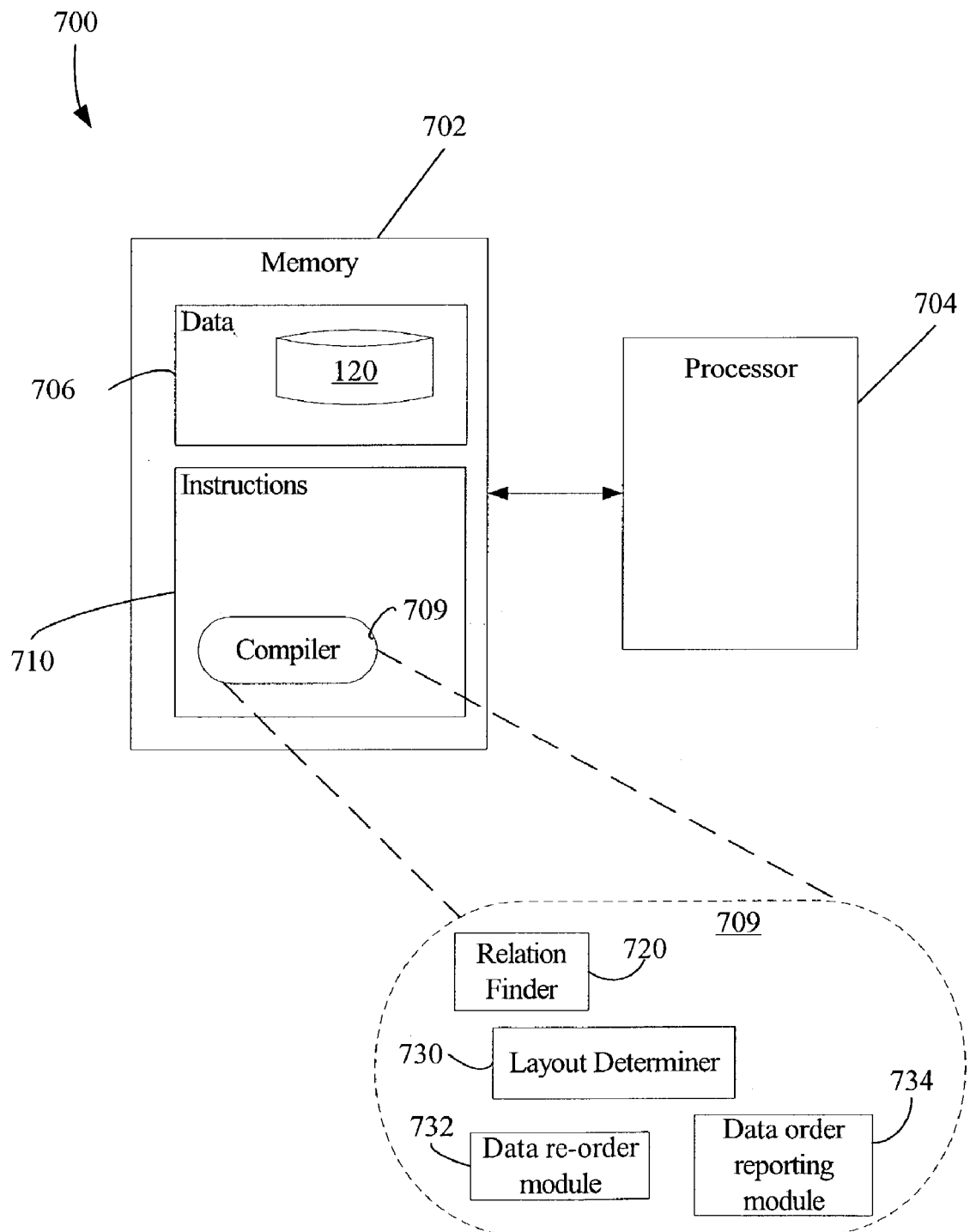
FIG. 7 is a block diagram illustrating a system capable of performing profile-guided data layout.

An example of one such type of processing system is shown in FIG. 7. System 700 may be used, for example, to execute the processing for a method of profile-guided data layout, such as the embodiments described herein. System 700 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, personal digital assistants and other handheld devices, engineering workstations, set-top boxes and the like) may also be used. In one embodiment, sample system 700 may be executing a version of the Windows™ operating system available from Microsoft Corporation, although other operating systems and graphical user interfaces, for example, may also be used.

Referring to FIG. 7, processing system 700 includes a memory system 702 and a processor 704. Memory system 702 is intended as a generalized representation of memory and may include a variety of forms of memory, such as a hard drive, CD-ROM, random access memory (RAM), dynamic random access memory (DRAM), static random access memory (SRAM) and related circuitry.

Memory system 702 may store instructions 710 and/or data 706 represented by data signals that may be executed by processor 704. The instructions 710 and/or data 706 may include code for performing any or all of the techniques discussed herein. For an embodiment wherein the method 100, 600 is performed automatically, instructions 710 may include a compiler 709.

FIG. 7 illustrates that the instructions implementing an embodiment 100, 600 of the method discussed herein may be logically grouped into various functional modules. For an embodiment performed by a compiler 709, the compiler 709 may include a relation finder 720, and a layout determiner 730. The compiler 709 may also include a data re-order module 732 and a data order reporting module 734. For at least some embodiments of a profiled-guided data layout method, a compiler 709 may utilize one or the other of the modules 732, 734, but not both.

When executed by processor 704, the relation finder 720 determines the temporal behavior among designated data elements, as discussed above in connection with FIGS. 1 and 4. That is, the relation finder 720 may determine temporal behavior among fields of a designated object or structure. Or, the relation finder 720 may determine the temporal relationship among local variables or among global variables. If more than one class of data elements is designated, then the relation finder 720 may determine temporal relationships for each designated class. For at least one embodiment, the relation finder 720 builds a VAG 410 (FIG. 4) for each designated class of data elements.

The layout determiner 730, when executed by the processor 704, determines a suggested data ordering for the designated data elements. For at least one embodiment, the layout determiner 730 utilizes a known code layout tool and the VAG 410 to determine a suggested ordering for each designated class of data elements.

When executed by a processor 704, the data re-order module 732 automatically re-orders data elements in accordance with the suggested ordering determined by the layout determiner 730.

In contrast, when executed by a processor 704, the data order reporting module 734 does not automatically re-order data elements but instead communicates the suggested ordering to a user.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. A method, comprising:

determining, based upon profile information for an application, a temporal relationship between a first data element and a second data element; and determining a suggested data ordering for the first data element in relation to the second data element, based on the temporal relationship;

wherein said first and second data elements are of a data type other than data members of an object.

2. The method of claim 1, wherein:

the first and second data elements are fields of a single data structure.

3. The method of claim 1, wherein:

the first and second data elements are local variables associated with a single procedure.

4. The method of claim 1, wherein:

the first and second data elements are global variables.

5. The method of claim 1, wherein:

the first and second data elements are function pointers of a virtual function table.

6. A method, comprising:

determining, based upon profile information for an application, a temporal relationship between a first data element and a second data element; and determining a suggested data ordering for the first data element in relation to the second data element, based on the temporal relationship;

wherein the temporal relationship indicates that the first and second data elements are referenced sequentially, without intervening access of a third data element.

7. The method of claim 6, wherein:

the first data element and the second data element are included within a designated data class, the designated data class further including a plurality of additional elements; and the method further comprises determining a temporal relationship between each data element, in relation to every other data element, in the designated data class.

8. The method of claim 7, further comprising:

determining a suggested data ordering for each data element in the designated data class.

9. The method of claim 7, wherein:

determining a temporal relationship between each data element, in relation to every other data element, is performed for a plurality of designated data classes.

10. The method of claim 8, wherein:

determining a suggested data ordering for each data element in the designated data class is performed for a plurality of designated data classes.

11. The method of claim 1, further comprising:

automatically ordering the first and second data elements according to the suggested data ordering.

12. The method of claim 1, further comprising:

reporting the suggested data ordering to a user.

13. An article comprising:

a machine-readable storage medium having a plurality of machine accessible instructions;

wherein, when the instructions are executed by a processor, the instructions provide for determining, based upon profile information for an application, a temporal relationship between a first data element and a second data element; and determining a suggested data ordering for the first data element in relation to the second data element, based on the temporal relationship;

wherein said first and second data elements are of a data type other than data members of an object.

14. The article of claim 13, wherein:

the instructions that provide for determining a temporal relationship between the first and second data elements further provide for determining a temporal relationship between fields of a single data structure.

15. The article of claim 13, wherein:

the instructions that provide for determining a temporal relationship between the first and second data elements further provide for determining a temporal relationship between local variables associated with a single procedure.

16. The article of claim 13, wherein:

the instructions that provide for determining a temporal relationship between the first and second data elements further provide for determining a temporal relationship between global variables.

17. An article comprising:

a machine-readable storage medium having a plurality of machine accessible instructions;

wherein, when the instructions are executed by a processor, the instructions provide for determining, based upon profile information for an application, a temporal relationship between a first data element and a second data element; and determining a suggested data ordering for the first data element in relation to the second data element, based on the temporal relationship;

wherein the temporal relationship indicates that the first and second data elements are referenced sequentially, without intervening access of a third data element.

18. The article of claim 17, wherein:

the first data element and the second data element are included within a designated data class, the designated data class further including a plurality of additional elements; and the instructions further provide for determining a temporal relationship between each data element, in relation to every other data element, in the designated data class.

19. The article of claim 18, wherein the instructions further provide for:

determining a suggested data ordering for each data element in the designated data class.

20. The article of claim 18, wherein the instructions further provide for:

determining a temporal relationship between each data element, in relation to every other data element, for each of a plurality of designated data classes.

21. The article of claim 20, wherein the instructions further provide for:

determining, for each of a plurality of designated data classes, a suggested data ordering for each data element in the designated data class.

22. The article of claim 13, wherein the instructions further provide for:

automatically ordering the first and second data elements according to the suggested data ordering.

23. The article of claim 13, wherein the instructions further provide for:

reporting the suggested data ordering to a user.

24. A method, comprising:

generating a variables access graph (VAG) to represent the temporal relationships among a plurality of data elements associated with a designated data class;

wherein the VAG includes an edge between a first node and a second node, each node representing one of the data elements, if profile information reflects that the second node is accessed after the first node at least once, without any intervening access to a third data element in the designated data class; and utilizing the variables access graph to determine a suggested data ordering for the data elements.

25. A method comprising:

generating a variables access graph to represent the temporal relationship among a plurality of data elements associated with a designated data class; and utilizing the variables access graph to determine a suggested data ordering for the data elements;

wherein generating a variables access graph further comprises identifying as nodes each data element in the designated class;

representing a first directed edge between two of the nodes; and assigning a weight, based on profile data, to each of the first directed edges.

26. The method of claim 25, further comprising:

representing a second directed edge, associated with the opposite direction than the first directed edge, between each of the nodes; and assigning a weight, based on profile data, to the second directed edge between each of the nodes.

27. The method of claim 25, further comprising:

representing a directed edge between each node and itself; and assigning a weight, based on profile data, to the edge between each node to itself.

28. The method of claim 25, wherein assigning a weight further comprises:

determining a count value, based on profile data.

29. The method of claim 28, wherein determining a count value further comprises:

consulting a hash table to determine the count value.

30. An article comprising:

a machine-readable storage medium having a plurality of machine accessible instructions;

wherein, when the instructions are executed by a processor, the instructions provide for generating a variables access graph to represent the temporal relationships among a plurality of data elements associated with a designated data class;

wherein the VAG includes an edge between a first node and a second node, each node representing one of the data elements, if profile information reflects that the second node is accessed after the first node at least once, without any intervening accesses to a third data element in the designated data class; and utilizing the variables access graph to determine a suggested data ordering for the data elements.

31. An article comprising:

a machine-readable storage medium having a plurality of machine accessible instructions;

wherein, when the instructions are executed by a processor, the instructions provide for generating a variables access graph to represent the temporal relationships among a plurality of data elements associated with a designated data class; and utilizing the variables access graph to determine a suggested data ordering for the data elements;

wherein the instructions that provide for generating a variables access graph further comprise:

instructions that provide for identifying as nodes each data element in a designated class;

instructions that provide for representing a first directed edge between each of the nodes; and instructions that provide for assigning a weight, based on profile data, to each of the first directed edges.

32. The article of claim 31, wherein the instructions further provide for:

representing a second directed edge, associated with the opposite direction than the first directed edge, between each of the nodes; and assigning a weight, based on profile data, to the second directed edge between each of the nodes.

33. The article of claim 31, wherein the instructions further provide for:

representing a directed edge between each node and itself; and assigning a weight, based on profile data, to the edge between each node to itself.

34. The article of claim 31, wherein the instructions that provide for assigning a weight further comprise:

instructions that provide for determining a count value, based on profile data.

35. The article of claim 34, wherein instructions that provide for determining a count value further comprise:

instructions that provide for consulting a hash table to determine the count value.

36. A compiler, comprising:

a relation finder module to determine, based on profile data for a software application, a first plurality of directed temporal relationships, each of which reflects the number of times a second data element in a designated data class is referenced after a first data element in the designated data class, without an intervening access to any other data element in the designated data class; and a layout determiner to determine a suggested data ordering for the data elements of the designated data class.

37. The compiler of claim 36, further comprising:

a data reorder module to automatically reorder the data elements of the designated data class in accordance with the suggested data ordering.

38. The compiler of claim 36, further comprising:

a data order reporting module to communicate the suggested data ordering to a user.

39. The compiler of claim 36, wherein:

the relation finder module is further to determine, based on the profile data for the software application, a second plurality of directed temporal relationships, each of which reflects the number of times the first data element is referenced after the first data element, without an intervening access to any other data element in the designated data class.

40. The compiler of claim 36, wherein:

the relation finder module is further to determine, based on the profile data for the software application, a third plurality of directed temporal relationships, each of which reflects the number of times a data element in the designated data class is referenced after itself, without an intervening access to any other data element in the designated class.

41. The compiler of claim 36, wherein:

the relation finder module is further to generate a variables access graph.

42. The compiler of claim 41, wherein:
the layout determiner module is further to utilize the variables access graph to determine a suggested data ordering for the data elements of the designated data class.

43. A system, comprising:
a processor; and
a dynamic random access memory (DRAM) having a plurality of machine accessible instructions stored therein;
wherein, when the instructions are executed by the processor, the instructions provide for
determining, based on profile data for a software application, a first plurality of directed temporal relationships, each of which reflects the number of times a second data element in a designated data class is referenced after a first data element in the designated data class, without an intervening access to any other data element in the designated data class; and
determining a suggested data ordering for the data elements of the designated data class.

44. The system of claim 43, wherein the instructions further provide for:
automatically reordering the data elements of the designated data class in accordance with the suggested data ordering.

45. The system of claim 43, wherein the instructions further provide for:
communicating the suggested data ordering to a user.

46. The system of claim 43, wherein the instructions further provide for:
determining, based on the profile data for the software application, a second plurality of directed temporal relationships, each of which reflects the number of times the first data element is referenced after the first data element., without an intervening access to any other data element in the designated data class.

47. The system of claim 43, wherein the instructions further provide for:
determining, based on the profile data for the software application, a third plurality of directed temporal relationships, each of which reflects the number of times a data element in the designated data class is referenced after itself, without an intervening access to any other data element in the designated class.

48. The system of claim 43, wherein the instructions further provide for:
generating a variables access graph.

49. The system of claim 48, wherein:
the instructions that provide for determining a suggested data ordering for the data elements of the designated data class further provide for utilizing the variables access graph to determine a suggested data ordering for the data elements of the designated data class.

50. A method comprising:
determining, based upon profile information for an application, a temporal relationship between a first data element and a second data element;
representing the temporal relationship between the first data element and the second data element as a variables access graph, wherein a directed edge between a node representing the first data element and a node representing the second data element reflects a weight associated with the temporal relationship; and
determining a suggested data ordering for the first data element in relation to the second data element, based on the temporal relationship.

51. An article comprising: a machine-readable storage medium having a plurality of machine accessible instructions; wherein, when the instructions are executed by a processor, the instructions provide for determining, based upon profile information for an application, a temporal relationship between a first data element and a second data element;
representing the temporal relationship between the first data element and the second data element as a variables access graph, wherein a directed edge between a node representing the first data element and a node representing the second data element reflects a weight associated with the temporal relationship; and
determining a suggested data ordering for the first data element in relation to the second data element, based on the temporal relationship.

* * * * *